July 7, 1931.                R. B. FEHR                1,813,875
                              GEAR
                      Filed March 19, 1931         3 Sheets-Sheet 2

INVENTOR
Roy B. Fehr
BY
Evans & McCoy
ATTORNEYS

July 7, 1931.　　　　R. B. FEHR　　　　1,813,875

GEAR

Filed March 19, 1931　　　3 Sheets-Sheet 3

INVENTOR
Ray B. Fehr
BY
Evans & McCoy
ATTORNEYS

Patented July 7, 1931

1,813,875

UNITED STATES PATENT OFFICE

ROY B. FEHR, OF DETROIT, MICHIGAN, ASSIGNOR TO GEAR PROCESSING, INC., OF CLEVELAND, OHIO, A CORPORATION OF OHIO

GEAR

Application filed March 19, 1931. Serial No. 523,747.

This invention relates to gears for transmitting power from a drive shaft to a driven shaft, and is a continuation in part of my copending application Serial No. 472,626 filed August 2, 1930.

One of the objects of the present invention is to provide gears which will remain practically silent during operation under light and heavy loads, and at all operating speeds.

Another object is to provide a pair of quietly operating gears having the teeth arranged to engage each other mainly while they are passing through the angle of recess, to thereby provide substantially non-impacting engagement of the mating teeth.

Another object is to provide a pair of quietly operating gears in which the teeth thereof will initially contact with each other in the region of the pitch line with substantially non-impacting engagement, and will function mainly during the angle of recess.

Another object is to provide a pair of quietly operating gears for the transmission of power wherein substantially the only contact between the working faces of the gear teeth is the engagement of the addendum faces of the driving sides of the driving teeth with the dedendum faces of the driven sides of the driven teeth.

A further object is to provide a set of quietly operating gears of such construction that in operation the initial engagement of the meshing teeth will be delayed without altering the engagement of the teeth during their recess action.

With the foregoing and other objects in view which will be apparent from the following detailed description, this invention consists in certain novel features of construction and combinations of parts which will be readily understood by those skilled in the art to which the invention appertains.

In the drawings which illustrate suitable embodiments of the present invention.

In general, the present invention contemplates a system of gears which will operate quietly at all operating speeds within the audible range and during light or heavy loads. This quiet operation is obtained essentially by providing the driving teeth with such a relief to be hereinafter described that the tooth impacts which give rise to noise and vibration are materially lessened.

My invention is applicable, as will be evident from the following description, to both internal and external gears of the helical and spur type. Spur gears for all practical purposes are considered as helical gears having a zero helix angle.

My invention is applicable also to such helical and spur gears having tooth profiles of the class generally known as "epitrochoidal curves", these being those curves traced by a working point carried by one line which rolls about another. This class includes involute, cycloid, epicycloid and hypocycloid outlines used for gear teeth.

For the purpose of illustration, I have confined the drawings and description in general to helical gears.

I have found in gearing for transmitting power, that there are several conditions that cause the audible vibrations or noises from the engagement of mating gear teeth, and I have also found that by employing gears constructed in accordance with my invention in which particular attention is paid to certain factors, such noises can be entirely or substantially eliminated.

One of the conditions that causes noisy operation of conventional helical gears even when properly lubricated, is the fact that the tooth construction employed and the method of making gears used heretofore, resulted in more or less sudden or pronounced impact between the gear teeth as they came into engagement.

In a pair of conventional gears, initial engagement of the gear teeth occurs between the dedendum faces of the driving sides of the teeth and the addendum faces of the driven sides of the teeth during the angle of approach, with the result that the driven teeth engage the driving teeth with considerable impact and exert a substantial pushing or digging effect which is resisted by the driving teeth during the angle of approach. This sudden impact and resistance of the driving sides of the teeth to the action of the driven teeth creates a succession of clicking noises and vibrations which are audible in a pronounced and highly objectionable hum or whine.

Gear tooth structures can be produced according to my invention wherein the initial engagement between the driving and driven teeth is delayed, with the result that a substantial non-impacting initial engagement occurs in the region of the pitch line, and the total engagement takes place mainly during the angle of recess, without affecting the engagement of the teeth during their recess action as compared with conventional gears.

I have found that there are two important factors which have to do with the practically silent operation of gears. One of these factors is to utilize gears that would have substantially two teeth in contact at all times, it being conventional practice to have from 1.1 to 1.6 mathematically computed tooth contacts. I have found, however, that it is preferable to have two or more tooth contacts, although satisfactory results may be obtained by having from 1.7 to 2 mathematically computed contacts. These results have proved to be much better than when conventional practice is employed. The second factor is to modify the teeth so that they will be in engagement mainly during the period in which they are passing through the angle of recess without altering the engagement thereof during their recess action.

By the term "plurality of tooth contacts" it is to be understood that these contacts are mathematically determined or computed as the sum of the tooth contacts in the plane of rotation and in the axial direction of the teeth of the gears before modification of the same in accordance with the second factor to be hereinafter described.

With respect to the first factor tending toward noiseless operation, this being a plurality of tooth contacts, the gear tooth noise of accurate helical gears as a general rule decreases as the sum of the tooth contacts in the plane of rotation and in the axial direction increases. In order to obtain a plurality of mathematically computed tooth contacts which I have found should be substantially two or more, thus permitting greater manufacturing tolerances, the teeth of the gears must be so constructed and of such a width as to give the proper tooth action without a sacrifice in strength.

According to my invention I have obtained a plurality of tooth contacts with proper tooth action by properly correlating the following features: (1) relatively long teeth; (2) relatively high helix angle teeth; (3) relatively fine pitch teeth; (4) relatively low pressure angle teeth; and (5) uniform tooth spacing and uniform tooth contour.

Practical applications of my invention are the use of helical gears for motor vehicle transmissions and for engine timing gears. I have selected for illustration and description a pair of transmission gears which are suitable for driving a medium sized automobile in second speed.

In these gears the driving gear 10 and the driven gear 11 have their centers approximately four inches apart, the number of helical teeth which are of 12 diametral pitch for these gears being 30 and 40, respectively. Under these conditions I have employed and shown the teeth of the gears as being approximately 0.23 inches in working depth, and as having helix and normal pressure angles of approximately 43 and 12 degrees, respectively. The teeth shown on the gears 10 and 11 in the drawing are of relatively long working depth. In practice where the working depth is less than 2 divided by the normal diametral pitch the teeth are known as stub teeth, and consequently when the working depth is greater than this I consider them relatively long teeth.

In utilizing the combinatioin of the elements referred to I have found that in many applications for helical gears for silent operation a helix angle of 40 or 45 degrees may be used because the end thrust can be adequately provided for by suitable bearings and proper balancing of the sets of gears. In some cases, however, it may be necessary to use a helix angle as low, for example, as 35 degrees or even 30 degrees, which in helical gears is still considered as a relatively high helix angle. In the present illustration, however, the teeth are arranged at a helix angle of approximately 43 degrees with the result that in combination with the other features at least three pitch point contacts, or in other words, at least two tooth contacts, are provided in an axial direction.

In conventional gearing suitable for automobile transmissions, a diametral pitch of 7 or 8 is customary, but in the application of gears made according to my invention, a diametral pitch of 12 may be used to accomplish the desired result, which pitch it will be seen is relatively fine. By the use of a fine pitch the number of teeth used in the gears is relatively large, and therefore there will be more tooth contacts than if the pitch were coarser and less teeth were used.

In order to utilize the present invention to the best advantage, it is desirable to use as low a pressure angle as possible to give the proper tooth action and yet without causing the active profile of the teeth to be too near the base circle. In the illustration shown, the relatively low normal pressure angle of 12 degrees is employed.

In connection with the foregoing desirable characteristics it is obvious that the width of the gear teeth must be such as to provide adequate tooth strength and resistance to wear, it being well known that an increase in the width of the gear teeth increases the number of tooth contacts in the axial direction for a given pitch and helix angle.

The other factor which I have found greatly tends to the elimination or reduction of noise in helical gears, is the provision for tooth engagement mainly during the angle of recess, which consists in forming the tooth contours in such a manner as to delay the initial engagement between the teeth to such an extent that this engagement will take place in the region of the pitch line without altering the engagement of the teeth during their recess action.

I obtain this delayed engagement of mating teeth by relieving certain portions of the active working sides of the teeth thereof which ordinarily are in contact during the angle of approach without, however, altering the portions of the active working sides of the teeth which function solely during the angle of recess.

In Figs. 1 to 5 of the drawings I have illustrated how this action is obtained by relieving the addendum faces of the driven sides of the teeth, which incidentally is the preferred method, and in Figs. 6 to 10 I have illustrated how this same action is obtained by relieving the dedendum faces of the driving sides of the teeth. As will be later described, the relief in either case may be gradual or abrupt, depending on different conditions. In the drawings I have used the same numbers for the gears and gear teeth of Figs. 6 to 10 as for the gears of Figs. 1 to 5, with the exception of the numbers which refer to the relief in each case.

Figure 1:
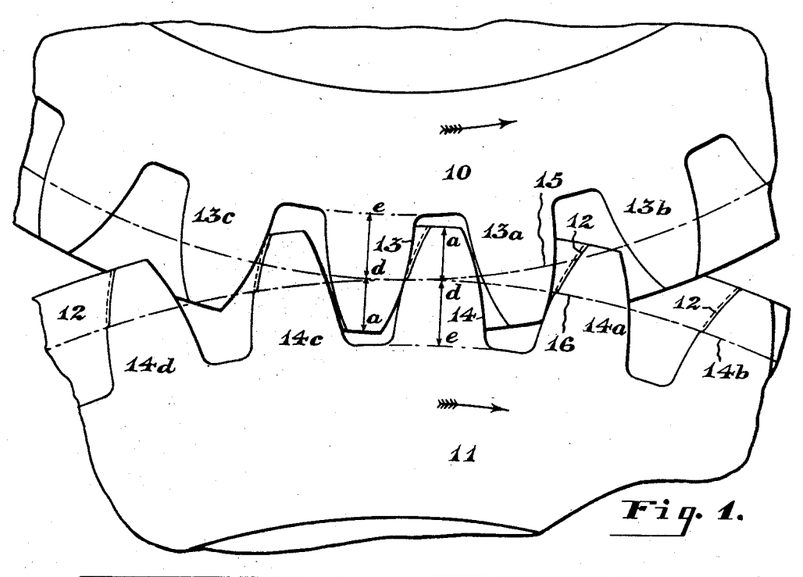
Figure 1 is a fragmentary side view of a pair of intermeshing gears of the helical type as viewed in the plane of rotation, the addendum faces of the driven sides of the teeth of the driven gear being relieved from their tips substantially to the pitch line.

As shown in Fig. 1, the addendum face $a$—$d$ of the driven side of each tooth of the driven gear 11 is formed with a substantial relief 12 in order that the initial engagement of the teeth will occur approximately at the pitch line. It will be noted that the relief 12 is abrupt at the pitch line and continues over the addendum face to the tip of the tooth.

Figure 6:
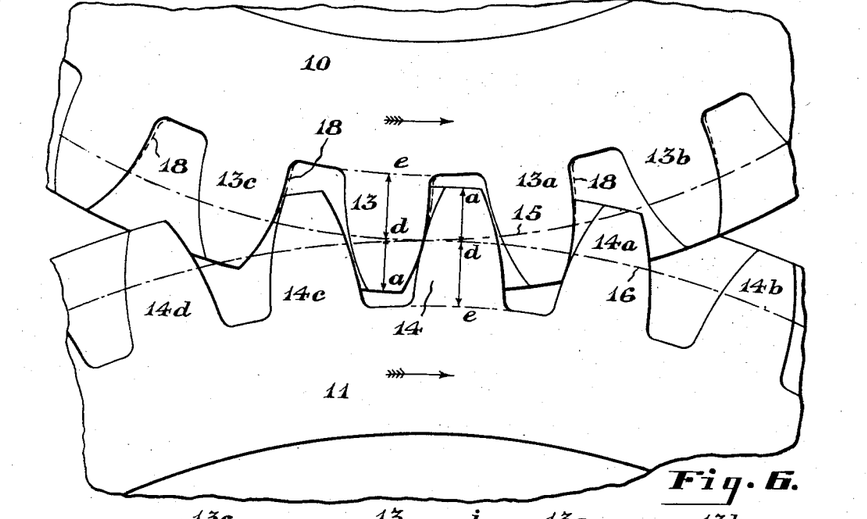
Fig. 6 is a side view of a pair of intermeshing gears of the helical type taken in the plane of rotation, the dedendum faces of the driving sides of the teeth of the driving gear being relieved from the pitch line substantially to the bottoms thereof.

As shown in Fig. 6, which illustrates the second method of obtaining recess action only, the dedendum face $d$—$e$ of each tooth of the driving gear 10 is formed with a relief 18 which is at a minimum in the region of the pitch line and gradually increases to a maximum at or near the bottom of the tooth.

Figures 7, 8, 9, 10:
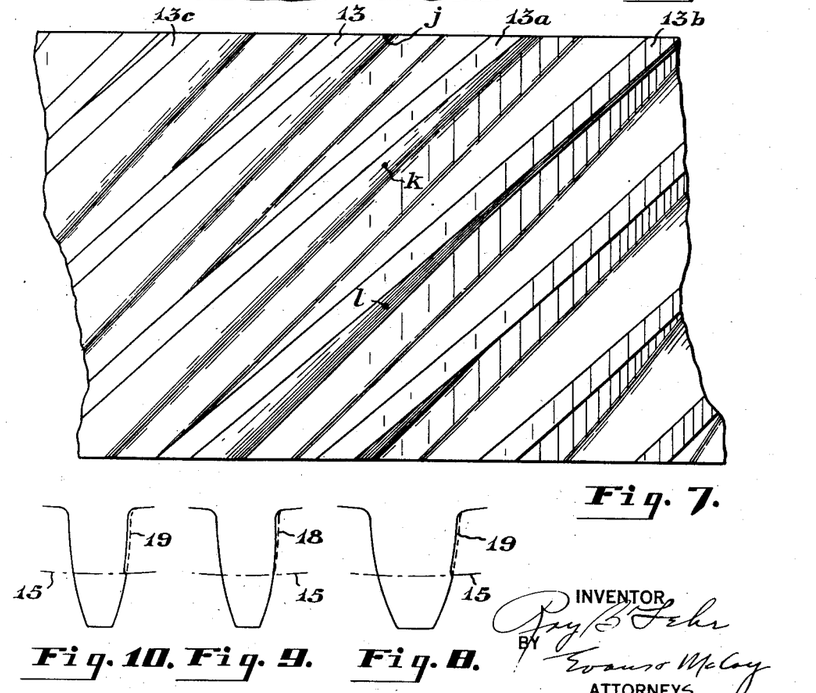
Fig. 7 is a plan view of the driving gear shown in Fig. 6, showing the number of tooth contacts obtained in an axial direction.
Fig. 8 is a diagrammatic view of a driving tooth having the dedendum face of the driving side thereof abruptly relieved in the region of the pitch line to the bottom thereof and showing the profile of the tooth in the plane of rotation.
Fig. 9 is a diagrammatic view of one of the teeth of the driving gear shown in Fig. 6, showing the profile of the tooth as viewed in the normal plane.
Fig. 10 is a diagrammatic view of the tooth form shown in Fig. 8, showing the profile of the tooth as viewed in the normal plane.

Regardless of which method is employed, it will be noted in Figs. 1 and 6 that the teeth 13 and 14 of the driving and driven gears 10 and 11 are in engagement with each other at their pitch point,—that is, the point at which their pitch circles 15 and 16 are tangent, and also the addendum face $a$—$d$ of the next forward adjacent driving tooth 13$^a$ is in engagement with the dedendum face $d$—$e$ of the next forward adjacent driven tooth 14$^a$, thus providing at least a two-point contact in the plane of rotation. It is also seen in Figs. 2 and 7 that in an axial direction a three-point engagement is provided at the pitch line, the points $j$, $k$ and $l$ of the driving teeth 13, 13$^a$ and 13$^b$ of the driving gear being in engagement at the points $m$, $n$ and $o$, respectively, with the teeth 14, 14$^a$ and 14$^b$ of the driven gear.

It is further seen in Figs. 1 and 6 that the next rear adjacent driving tooth 13$^c$ is within the space between the driven teeth 14$^c$, and 14$^d$, but the dedendum face $d$—$e$ thereof is not in engagement with the addendum face $a$—$d$ of the driven tooth $14^c$ which would be the case were the tooth $14^c$ in one case unrelieved over its addendum face at the driven side, or the tooth $13^c$ in the other case unrelieved over its dedendum driving face, as in conventional practice. Since there is no engagement of the teeth $13^c$ and $14^c$ at this position, and because of the relief 12 on the tooth $14^c$, or the relief 18 on the tooth $13^c$, as the case may be, it can be seen that these teeth will not engage each other until they reach the position of the teeth 13 and 14,—that is, they will initially engage substantially at the pitch line and continue this engagement throughout the angle of recess.

The mating gear teeth of the two gears, therefore, have substantially a recess action, or in other words, the engagement thereof is mainly between the addendum driving faces and the dedendum driven faces, thus substantially reducing objectionable tooth impacts by eliminating the digging action of the driven teeth into the driving teeth, without altering the recess action of the teeth.

Figures 2, 3, 4, 5:
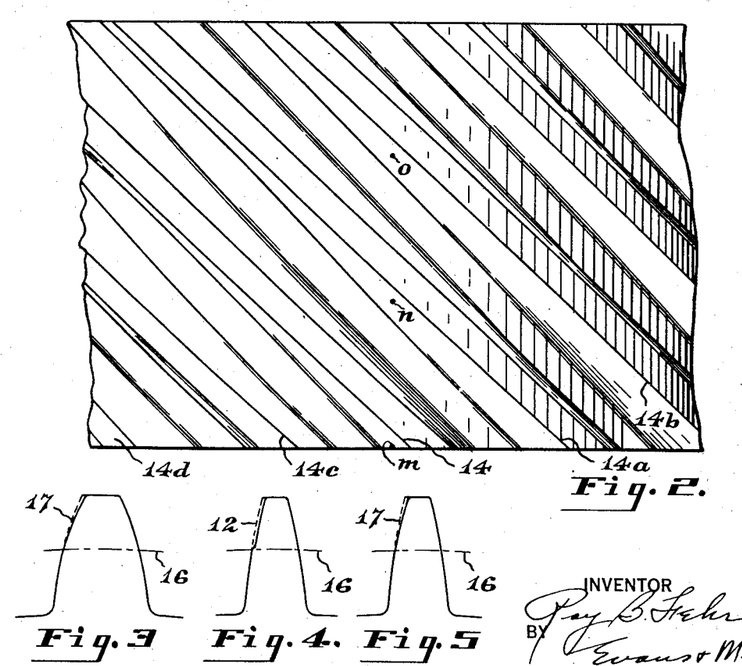
Fig. 2 is a plan view of the driven gear shown in Fig. 1, showing the number of tooth contacts obtained in the axial direction.
Fig. 3 is a diagrammatic view of a driven tooth having the addendum face of the driven side gradually relieved, and showing the profile of the tooth as viewed in the plane of rotation.
Fig. 4 is a diagrammatic view of one of the teeth of the driven gear shown in Fig. 1, showing the profile of the tooth as viewed in the normal plane.
Fig. 5 is a diagrammatic view of the tooth illustrated in Fig. 3, showing the tooth profile as viewed in the normal plane.

In finishing gears in accordance with Figs. 1 to 5, the addendum faces of the teeth may be relieved abruptly in the region of the pitch line and continue in any desired manner, as indicated by the relief 12 in Figs. 1 and 4, to form a complete relief from the tips of the teeth to the region of the pitch line. It may be desirable in some cases of addendum relief to employ the gradual relief 17 illustrated in Figs. 3 and 5, which is used where it is desired to have a tooth profile bearing characterized by a relief gradually fading out between the tip of the tooth and the pitch line to avoid the sudden impact of the teeth upon initial engagement.

In finishing helical gears in accordance with Figs. 6 to 10, the dedendum face of the driving sides of the teeth, as shown in Figs. 1 and 4, may be formed with a gradually increasing relief from the region of the pitch line to the bottoms of the teeth, as indicated by the gradual relief 18 in Figs. 6 and 9 or, as shown in Figs. 8 and 10, the relief may be abrupt at the pitch line and continue to the bottom of the tooth, as indicated by the numeral 19.

It is to be understood that the object of the dedendum relief of gradually increasing depth,—that is, the relief 18, is to obtain tooth profile bearings on the driving gear characterized by a relief gradually fading out between the pitch line and the bottoms of the teeth to avoid, as heretofore described, sudden impact of the teeth upon initial engagement.

The particular relief to be used,—that is, the relief 12 or the relief 17 in the case of addendum relief, and the relief 19 or the relief 18 in the case of dedendum relief, depends somewhat upon the particular design of gears.

The contours of the addendum faces of the driving sides of the driving gear teeth and the dedendum faces of the driven sides of the driven gear teeth, in order to obtain the proper driving action referred to, remain substantially unchanged or unrelieved from the particular profile used for both of the intermeshing gears, regardless of whether the addendum or dedendum relief is used.

In the case of either of the abrupt reliefs, no appreciable impact will result at the time of initial engagement because a given tooth having such a relief when passing through the angle of approach will not have any engagement with the mating tooth of the driven gear, since the load is borne by the teeth of the gears which are in the angle of recess.

In the event the abrupt reliefs are used, the teeth will engage each other in the region of their pitch line,—that is, when the approach angle is approximately zero, and in case the gradual reliefs are used, they may actually engage each other before passing into the recess angle. In certain cases it may be desirable to use one form of relief, and in other cases it may be desirable to use the other form of relief.

The feature of addendum relief in all cases, therefore, can be stated as being incorporated in the driven sides of all driven teeth, and the feature of dedendum relief in all cases can be stated as being incorporated in the driving sides of all driving gear teeth, it being borne in mind that the addendum faces of the driving sides of the driving teeth and the dedendum faces of the driven sides of the driven teeth always retain their substantially unrelieved profiles.

In carrying out my invention I form the reliefs described by employing any one of several different methods. As an example, the addendum faces of the driven sides of the teeth in the one case, and the relief on the dedendum faces of the driving sides of the teeth in the other case, may be completely formed during the original tooth cutting operation, by lapping, grinding, or burnishing methods after the teeth are cut to the proper profile, or by partially forming it during the original tooth cutting operation and finishing it by lapping, grinding, or burnishing methods.

In any event, after the gear teeth have been formed and the gear suitably heat treated and the bore of the same ground, I preferably finish the gear in such a manner as to obtain uniform tooth contours, uniformity of tooth spacing, and a suitable degree of concentricity. One practical way of accomplishing this result I have found to be by the use of the method disclosed in the Copland et al. Patent 1,683,867, granted September 11, 1928. According to this method an internal gear wheel or lap having its teeth equal in number and complementary in shape to the teeth of the gear to be finished, is coaxially registered with the gear, and relative reciprocating motions are imparted thereto, thus subjecting the teeth to mutual reciprocating action. During the relative reciprocating motions of the gear and lap, the registration of the gear and lap is preferably progressively changed by intermittently and angularly advancing one in relation to the other while they are out of mutual engagement.

Assuming that in the gear to be finished one or more teeth are distorted, so as to come into contact with the lap in advance of the others, these advanced surfaces will first be worn down as will also the contacting portions of the lap. However, by reason of the progressive change in registration, the wearing-away of the lap is uniformly distributed over a number or all of the teeth thereof, whereas the lapping of the gear teeth continues on the high spots until these are reduced to the level of the other tooth portions. This same action occurs when the laps are inaccurate. Therefore, not only the gear teeth, but also the lap teeth, will constantly approach the average form as the lapping proceeds. In other words, the effect of the continued progressive lapping is to average the contour and circular pitch of all the teeth in both the gear and lap, with the result that the teeth will have a uniform profile and will be equi-spaced.

In order to form the relief on the addendum faces of the driven sides of the driven gear teeth entirely by the lapping process, the corresponding faces of the lap teeth are formed in such a manner that when relative reciprocating motions are imparted to the particular gear and lap, the addendum relief will be formed, and similarly in order to form the relief on the dedendum faces of the driving sides of the driving gear teeth, the corresponding faces of the lap may be formed with a contour of such shape that when the gear and lap are given relative reciprocating movement the dedendum relief will be formed.

In some cases a portion of the relief may be previously cut or formed and then the working profile finished as just described during the lapping process.

In some cases, such as in motor vehicle transmissions, the driven gear often becomes a driving gear such as when coasting or when the engine is resisting the momentum of the car, but operates in the same direction as when driven. In this case it is very desirable to also relieve either the addendum faces of the driven sides of the teeth of the gear which is normally the driving gear, or the dedendum faces of the driving sides of the teeth of the gear which ordinarily is the driven gear.

Figure 11:
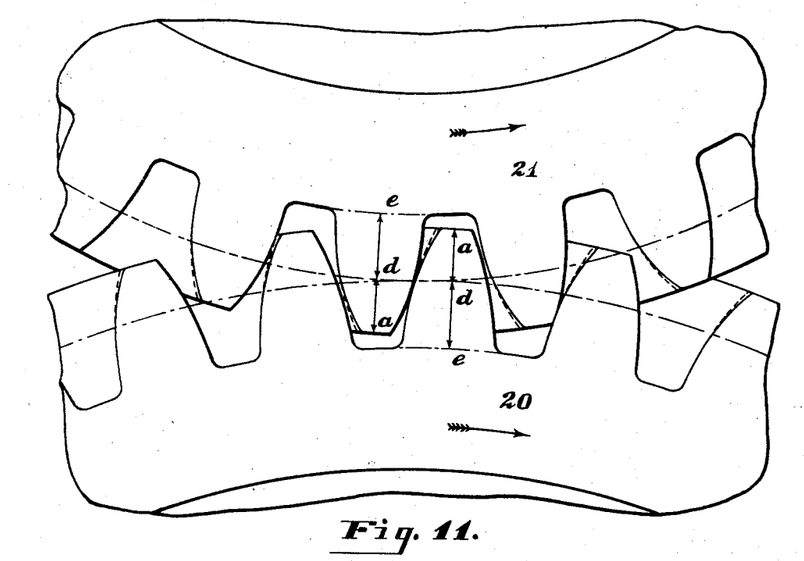
Fig. 11 is a fragmentary side elevation of a pair of gears arranged to be always driven in the same direction regardless of which gear is doing the driving, all addendum faces of the sides of the teeth which may be driven being relieved.

A set of gears of this character is illustrated in Fig. 11 and it will be noted in this view where either gear may be the driver but always in the same direction, that the addendum faces $a-d$ of the sides of the teeth of the lower gear 20, which are the driven sides thereof when the upper gear 21 is the driving gear, are gradually relieved from the tips thereof to the region of the pitch line. Similarly, it will be noted that the addendum faces $a-d$ of the sides of the teeth of the upper gear 21 which are the driven sides thereof when the lower gear 20 is the driving gear, are gradually relieved from the tips thereof to the region of the pitch line.

It is to be further noted in this view that regardless of which gear is doing the driving, the direction of rotation being the same, the addendum faces $a-d$ of the driving sides of the teeth and the dedendum faces $d-e$ of the driven sides of the teeth retain their original unrelieved profile to this provide substantially only a recess action.

It is to be understood, however, that the abrupt relief may be used instead of the gradual relief, and furthermore that instead of addendum relief the previously described dedendum relief may be used.

Instead of providing a relief on the teeth of both gears in this case, it may be desirable to omit the addendum relief on the teeth of the lower gear 20 and to provide a dedendum relief on the sides of the teeth of the upper gear 21 which are the driving sides when the upper gear is the driving gear. In other words, the teeth of the lower gear 20 are formed with no relief whatsoever and the addendum surfaces of the sides of the teeth of the upper gear which are the driven sides when the lower gear 20 is driving, are relieved to delay initial engagement of the teeth, and also the dedendum faces of the opposite sides of the teeth of the gear 21 are relieved to delay initial engagement of the teeth when the lower gear 20 is the driven gear.

This arrangement of reliefs may also be applied to the lower gear 20 which is ordinarily the driven gear. In other words, no relief is applied to the teeth of the upper gear, and in addition to the addedum relief now shown on the teeth of the lower gear, a dedendum relief may be formed on the opposite sides of the teeth which are the driving sides when the lower gear acts as a driving gear.

Figure 12:
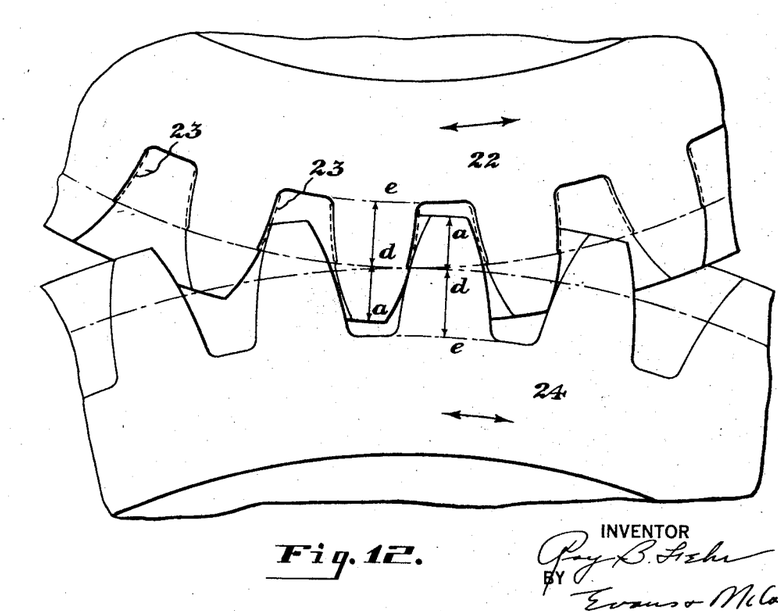
Fig. 12 is a fragmentary side elevation of a pair of gears which are reversible in direction and in which one gear is always driving, the dedendum faces of both sides of the driving gear being relieved.

There is a still further condition, such as in industrial practice, where one gear always does the driving but may be reserved in its direction of rotation. In this case it is desirable to use a driving gear in which both dedendum faces of each tooth are relieved in the manner described. A set of gears of this character is illustrated in Fig. 12, and it will be noted here where the gears are reversible in their direction of rotation and one gear is always the driving gear, that the dedendum faces $d-e$ of both sides of the driving gear 22 are formed with a substantial relief 23 which terminates abruptly at the pitch line. It will also be noted here that the addendum faces *a—d* thereof and the dedendum faces *d—e* of the driven gear retain their original unrelieved profile to thus provide substantially only a recess action.

It is to be understood that the relief 23 may be of the gradual type, and furthermore that instead of the dedendum faces of the driving gear 22 being relieved, both addendum faces of the driven gear 24 may be relieved.

In each set of gears operating under the three conditions described,—that is (*a*) one gear always doing the driving in one direction (*b*) either gear doing the driving, but in the same direction, and (*c*) one gear always doing the driving, but in either direction, the same action is inherent. In other words, it will be observed from the drawings and foregoing description, that for each of the three conditions set forth, I have provided a set of gears having tooth profiles of the class generally known as "epitrochoidal curves" wherein it is possible to delay the initial engagement of the teeth coming into contact without altering the engagement of the teeth during their recess action. In other words, in following out my invention, gearing may be constructed wherein the teeth will engage each other initially in the region of the pitch line without substantial impact, without affecting their recess action, thus providing gears which in operation will remain practically silent during light and heavy loads and at all normal operating speeds.

While my invention has been described as being particularly advantageous in connection with helical gears, it will also be seen that its essential features may be applied with considerable benefit to the manufacture and operation of spur gears which may be considered as helical gears with a zero helix angle. In the application of this invention to spur gears the preferred form of relief would be the relief of gradually increasing depth.

Where used in the specification and claims the terms "uniform spacing" and "uniform contour" of the teeth are intended to mean substantially that uniformity which will insure that there will be no irregular or rattling sounds when the gears are run together without load such as are characteristic of gears that have errors in their contour and spacing which will preclude silent operation.

In the drawings, the dotted lines are merely shown to indicate the contour that the teeth would have, were they not relieved in any of the manners described, and furthermore it will be understood that the reliefs as shown are exaggerated.

In the claims, the term "active sides" where used, is to be interpreted as meaning the particular sides of the gear teeth which function during operation.

Aside from the specific embodiments of the invention herein shown and described, it will be understood that numerous details of construction may be altered or omitted without departing from the spirit and scope of this invention. I do not desire to limit the invention to the exact construction herein set forth, as I desire to claim the same broadly as well as specifically as indicated in the appended claims.

What I claim is:

1. A pair of intermeshing gears, each tooth of the driven gear having its driven side gradually relieved on the addendum face from a maximum at its tip to a minimum at its pitch line to provide a gradual substantially non-impacting engagement with the mating tooth of the driving gear, the driving faces of the teeth of the driving gear being substantially unrelieved, whereby quiet operation of said gears is obtained.

2. A pair of quietly operating intermeshing gears, the addendum faces of the driven sides of the teeth of the driven gear being relieved to provide substantially non-impacting engagement with the mating teeth of the driving gear, and the addendum faces of the driving sides of the teeth of the driving gear being substantially unrelieved, whereby relatively quiet operation of the gears is obtained.

3. A pair of intermeshing gears, each tooth of the driven gear having its driven side uniformly relieved on the addendum face from its tip to its pitch line to eliminate contact with the mating tooth of the driving gear during the angle of approach and to provide engagement between the teeth of said gears mainly during the angle of recess, the driving sides of the teeth of the driving gear being substantially unrelieved, whereby substantially noiseless and non-impacting operation of the mating teeth is obtained.

4. A pair of quietly operating intermeshing gears having relatively long, uniformly spaced teeth, the addendum faces of the driven sides of the teeth of the driven gear being relieved to provide substantially non-impacting engagement with the mating teeth of the driving gear, and the addendum faces of the driving sides of the teeth of the driving gear being substantially unrelieved, whereby relatively quiet operation of said gears is obtained.

5. A pair of intermeshing helical gears, each gear having relatively long teeth arranged at a relatively high helix angle, the addendum faces of the driven sides of the teeth of the driven gear being relieved to provide substantially non-impacting engagement of the mating teeth of said gears, and the addendum faces of the driving sides of the teeth of the driving gear being substantially unrelieved, whereby the main engagement of said teeth occurs in the angle of recess, and a relatively quiet operation of said gears is obtained.

6. A pair of intermeshing helical gears, each gear having relatively long teeth of low pressure angle, the addendum faces of the driven sides of the teeth of the driven gear being relieved to provide substantially non-impacting engagement with the teeth of the driving gear, and the addendum faces of the driving sides of the teeth of the driving gear being unrelieved, whereby relatively quiet operation of said gears is obtained.

7. A pair of intermeshing helical gears each having relatively long, relatively fine pitch teeth arranged at a relatively high helix angle and having a relatively low pressure angle, said teeth being uniformly spaced, the addendum faces of the driven sides of the teeth of the driven gear being relieved to provide a substantially non-impacting engagement with the mating teeth of the driving gear, and the addendum faces of the driving sides of the teeth of the driving gear being substantially unrelieved, whereby initial engagement of the mating teeth of said gears coming into contact is gradual, thereby providing engagement thereof mainly during the angle of recess to materially lessen vibration and reduce impact shocks.

8. A pair of intermeshing external gears, the addendum faces of the driven sides of the teeth of the driven gear being relieved to provide a substantially non-impacting engagement of the mating teeth of said gears, and the addendum faces of the driving sides of the teeth of the driving gear being substantially unrelieved, said driving gear having at least two teeth in actual driving contact with the mating teeth of said driven gear, whereby quiet operation of said gears is obtained.

9. A pair of intermeshing helical gears, each gear having uniformly spaced teeth of uniform contours, each tooth of the driven gear having its driven side relieved on its addendum face to delay initial engagement and avoid substantial impact with the mating tooth of the driving gear, the driving side of each tooth of the driving gear being substantially unrelieved, said driving gear having at least two teeth in driving engagement with the mating teeth of said driven gear, whereby quiet operation of said gears is obtained.

10. A pair of quietly operating intermeshing gears, the dedendum faces of the driving sides of the teeth of the driving gear being relieved to provide substantially non-impacting engagement with the mating teeth of the driven gear, and the dedendum faces of the driven sides of the teeth of the driven gear being substantially unrelieved, whereby relatively quiet operation of the gears is obtained.

11. A pair of intermeshing gears, each tooth of the driving gear having its driving side substantially relieved on the dedendum face from its bottom to its pitch line to eliminate contact with the mating tooth of the driven gear during the angle of approach and to provide engagement between the teeth of said gears mainly during the angle of recess, the dedendum faces of the driven sides of the teeth of the driven gear being substantially unrelieved, whereby substantially noiseless and non-impacting operation of the mating teeth is obtained.

12. A pair of quietly operating intermeshing gears having relatively long, uniformly spaced teeth, the dedendum faces of the driving sides of the teeth of the driving gear being relieved to provide substantially non-impacting engagement with the mating teeth of the driven gear, and the addendum faces of the driving sides of the teeth of the driving gear and the dedendum faces of the driven sides of the driven gear being substantially unrelieved, whereby relatively quiet operation of said gears is obtained.

13. A pair of intermeshing helical gears, each gear having relatively long teeth arranged at a relatively high helix angle, the dedendum faces of the driving sides of the teeth of the driving gear being relieved to provide substantially non-impacting engagement of the mating teeth of said gears, and the dedendum faces of the driven sides of the teeth of the driven gear being substantially unrelieved, whereby the main engagement of said teeth occurs in the angle of recess, and a relatively quiet operation of said gears is obtained.

14. A pair of intermeshing helical gears, each gear having relatively long teeth of low pressure angle, the dedendum faces of the driving sides of the teeth of the driving gear being relieved to provide substantially non-impacting engagement with the teeth of the driven gear, and the dedendum faces of the driven sides of the teeth of the driven gear being unrelieved, whereby relatively quiet operation of said gears is obtained.

15. A pair of intermeshing helical gears each having relatively long, relatively fine pitch teeth arranged at a relatively high helix angle and having a relatively low pressure angle, said teeth being uniformly spaced, the dedendum faces of the driving sides of the teeth of the driving gear being relieved to provide a substantially non-impacting engagement with the mating teeth of the driven gear, and the addendum faces of the driving sides of the teeth of the driven gear and dedendum faces of the driven sides of the teeth of the driven gear being substantially unrelieved, whereby initial engagement of the mating teeth of said gears coming into contact is gradual, thereby providing engagement thereof mainly during the angle of recess to materially lessen vibration and reduce impact shocks.

16. A pair of intermeshing external gears, the dedendum faces of the driving sides of the teeth of the driving gear being relieved to provide a substantially non-impacting engagement of the mating teeth of said gears, and the dedendum faces of the driven sides of the teeth of the driven gear being substantially unrelieved, said driving gear having at least two teeth in actual driving contact with the mating teeth of said driven gear, whereby quiet operation of said gears is obtained.

17. A pair of intermeshing helical gears, each gear having uniformly spaced teeth of uniform contours, each tooth of the driving gear having its driving side relieved on its dedendum face to delay initial engagement and avoid substantial impact with the mating tooth of the driving gear, the dedendum face of the driven side of each tooth of the driven gear being substantially unrelieved, said driving gear having at least two teeth in driving engagement with the mating teeth of said driven gear whereby quiet operation of said gears is obtained.

18. The combination of intermeshed toothed gears having the addendum and dedendum portions of their teeth contoured to insure substantial non-engagement of the addendum portions of the teeth of one of said gears with the teeth of the other of said gears during the angle of approach by relieving only one of said portions of all the teeth of one of said gears.

19. The combination of intermeshed toothed gears having addendum and dedendum portions on each face of each tooth of both gears, one of said portions on the active side of all teeth of one of said gears being relieved, the other of said portions of the said one gear and the active faces of the teeth of said other gear being unrelieved, whereby initial engagement of the mating teeth of said gears is delayed and whereby the main engagement of the mating teeth occurs in the angle of recess.

20. The combination of intermeshed toothed gears reversible in their direction of rotation, said gears having the addendum and dedendum portions of their teeth contoured to insure substantial non-engagement of the addendum portions of the teeth of one of said gears with the dedendum portions of the teeth of the other of said gears during the angle of approach in either direction of rotation by relieving only one of said portions on both sides of all the teeth of one of said gears.

In testimony whereof I affix my signature.

ROY B. FEHR.

DISCLAIMER 1,813,875.—*Roy B. Fehr*, Detroit, Mich. GEAR. Patent dated July 7, 1931. Disclaimer filed September 19, 1933, by the assignee, *Gear Processing, Inc.*

Hereby enters this disclaimer:

1. To a pair of quietly operating, intermeshing gears, the addendum faces of the driven sides of the teeth of the driven gear being relieved to provide substantially non-impacting engagement with the mating teeth of the driving gear and the addendum faces of the driving sides of the teeth of the driving gear being substantially unrelieved, as set forth in claim 2, except such as have the addendum faces at the opposite sides of the teeth of the driven gear substantially unrelieved.

2. To a pair of intermeshing gears, each tooth of the driven gear having its driven side uniformly relieved on the addendum face from its tip to its pitch line to eliminate contact with the mating tooth of the driving gear during the angle of approach and to provide engagement between the teeth of said gears mainly during the angle of recess, as set forth in claim 3, except such as have the addendum face of each tooth of the driven gear opposite the addendum face of the driven side thereof substantially unrelieved.

3. To a pair of quietly operating, intermeshing gears, the dedendum faces of the driving sides of the teeth of the driving gear being relieved to provide substantially non-impacting engagement with the mating teeth of the driven gear, and the dedendum faces of the driven sides of the teeth of the driven gear being substantially unrelieved, as set forth in claim 10, except such as have the dedendum faces of the sides of the teeth opposite the driving sides thereof substantially unrelieved.

4. To a pair of intermeshing gears, each tooth of the driving gear having its driving side substantially relieved on the dedendum face from its bottom to its pitch line to eliminate contact with the mating tooth of the driven gear during the angle of approach and to provide engagement between the teeth of said gears mainly during the angle of recess, as set forth in claim 11, except such as have the dedendum face at the side opposite the driving side of each tooth substantially unrelieved.

5. To the combination of intermeshed toothed gears having the addendum and dedendum portions of their teeth contoured to insure substantial non-engagement of the addendum portions of the teeth of one of said gears with the teeth of the other of said gears during the angle of approach by relieving only one of said portions of all the teeth of one of said gears, as set forth in claim 18, except such as have the portions at the opposite side of all the teeth of the said one gear corresponding to the relieved portions thereof substantially unrelieved.

6. To the combination of intermeshed toothed gears having addendum and dedendum portions on each face of each tooth of both gears, one of said portions on the active side of all teeth of one of said gears being relieved, the other of said portions of the said one gear and the active faces of the teeth of said other gear being unrelieved, as set forth in claim 19, except such as have the portions at the opposite sides of all teeth of the said one gear corresponding to the relieved portions thereof substantially unrelieved.

7. To claim 20, which reads as follows:

"The combination of intermeshed toothed gears reversible in their direction of rotation, said gears having the addendum and dedendum portions of their teeth contoured to insure substantial non-engagement of the addendum portions of the teeth of one of said gears with the dedendum portions of the teeth of the other of said gears during the angle of approach in either direction of rotation by relieving only one of said portions on both sides of all the teeth of one of said gears."

[*Official Gazette October 10, 1933.*]